United States Patent [19]

Staudacher et al.

[11] 3,871,684
[45] Mar. 18, 1975

[54] GAS GENERATOR

[75] Inventors: Gerald R. Staudacher, Bay City; Thomas E. Dergazarian; George A. Lane, both of Midland, all of Mich.

[73] Assignee: The Dow Chemical Company, Midland, Mich.

[22] Filed: July 31, 1972

[21] Appl. No.: 276,397

Related U.S. Application Data

[63] Continuation-in-part of Ser. No. 168,234, Aug. 2, 1971, abandoned.

[52] U.S. Cl. ............. 280/150 AB, 23/281, 102/39, 138/37
[51] Int. Cl. ............................................ B60r 21/08
[58] Field of Search ............... 280/150 AB; 23/281; 138/37, 38, 41; 102/39

[56] References Cited
UNITED STATES PATENTS

| | | | |
|---|---|---|---|
| 3,066,014 | 11/1962 | White et al. | 280/150 AB |
| 3,305,319 | 2/1967 | Kowalick et al. | 23/281 |
| 3,516,685 | 6/1970 | Goetz | 280/150 AB |
| 3,527,472 | 9/1970 | Leising | 280/150 AB |
| 3,532,360 | 10/1970 | Leising | 280/150 AB |
| 3,558,285 | 1/1971 | Ciccone et al. | 23/281 |
| 3,618,976 | 11/1971 | Lesing | 280/150 AB |
| 3,618,980 | 11/1971 | Leising | 280/150 AB |
| 3,618,981 | 11/1971 | Leising | 280/150 AB |
| 3,674,059 | 7/1972 | Stephenson | 280/150 AB |
| 3,692,495 | 9/1972 | Schneiter et al. | 280/150 AB |

*Primary Examiner*—David Schonberg
*Assistant Examiner*—John P. Silverstrim
*Attorney, Agent, or Firm*—Bruce M. Kanuch; Edward E. Schilling; Glenn H Korfhage

[57] ABSTRACT

An apparatus and method is provided for rapidly generating cooled gases through the reaction of a pyrochemical mixture.

13 Claims, 9 Drawing Figures

GAS GENERATOR

CROSS REFERENCE TO RELATED APPLICATION

This application is a continuation-in-part of application Ser. No. 168,234, filed Aug. 2, 1971, now abandoned.

BACKGROUND OF THE INVENTION

Development of vehicle safety apparatus in the form of automatically inflating gas cushion systems, referred to as "crash bags," has become in many instances a high priority project of great importance. Although many designs for the crash bag have been proposed, no inflation system has been developed, prior to the present invention, which satisfactorily meets the variety of necessary vehicle requirements. Systems have been developed, for example, which employ a compressed gas cylinder connected to an inflatable bag. The gas is released upon the opening of an explosively actuated valve upon receipt of a signal from a crash impact sensing device, e.g. U.S. Pat. No. 2,850,291. The size and weight requirements for use of the pressurized gas cylinder, however, create difficult problems in meeting location and vehicle balance requirements.

Pyrotechnic charges have been previously suggested for providing gas to an inflatable chamber or device, e.g. U.S. Pat. Nos. 3,269,310 and 3,324,816. However, in such methods, as in any other method for generating inflating gas, development of an acceptable vehicle safety system which provides proper occupant protection involves meeting a number of rigorous requirements. The gas must be generated, and the crash bag inflated, within a fraction of a second after a crash is sensed. The noise generated by employment of the system must be generally non-injurious to the occupants. Similarly, the gases inflating the bag must be generally non-injurious to the occupants and must be cool enough to avoid thermal injury to occupants when contacting the crash bag. The gas generating apparatus must also be of a design that is adaptable to fit into accessible and necessary or desirable locations in a vehicle.

Applicants have invented a device which generally meets all of the foregoing requirements.

SUMMARY OF THE INVENTION

The gas generator apparatus of the present invention comprises a container which holds a pyrochemical mixture in contact with ignition means capable of being activated by an external crash sensing device. A cooling means, e.g. a particulate coolant reactant and/or a porous heat sink member, is provided in the container to cool the gases generated upon ignition of the pyrochemical mixture. A baffle means, provided within the container to facilitate interaction of the hot gases with the cooling means, defines a passageway to an exhaust port from the container. Optionally a frangible member designed to rupture when a desired internal pressure is reached closes the exhaust port. The exhaust port is in communication with an inflatable bag. Optionally, a gas diffuser means is provided in communication with the exit of the exhaust port. The diffuser means functions to cool the gases exiting from the exhaust port, to dampen the shock waves generated by ignition of the pyrochemical mixture and also to screen out particulate matter entrained in the gas stream.

A mixture of cooled gases is produced in the following manner. A charge of hot gases is generated upon ignition of the pyrochemical in the first zone of the apparatus. These gases are mixed with the cooling means in a second zone contiguous to the first zone prior to the exit of the gases from the container. The cooled gases are immediately conducted through a restricted passageway adjacent the cooling means, into a third zone. The preceding sentence contemplates a structure such that once the gases pass through the cooling means, they enter the restricted passageway without traversing any significant intermediate surface or void, that is to say, a surface or void, e.g., a vane or an expansion zone, which would materially alter the critical properties of the gas phase per se, i.e., temperature, pressure, and velocity, but this shall not be construed to exclude a screen traversed by the gases before reaching the exit port, such as porous member 103 shown in FIGS. 5 and 6 and described more fully hereinafter, the principal purpose and effect of which is to retain the particulate coolant in the coolant chamber. Finally, the gases are released from the third zone through an exit port and into an inflatable container. The quantitative relationship of the charge of hot gases and cooling means is such that the charge of hot gases are cooled to a predetermined maximum temperature prior to exiting from the container.

DESCRIPTION OF THE INVENTION

Figure 1:
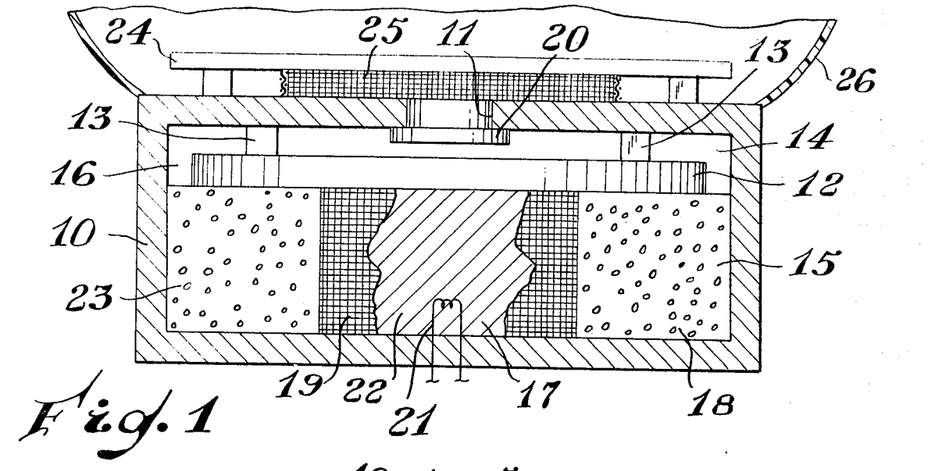
FIG. 1 shows a schematic side elevation of one embodiment of the gas generating apparatus of the present invention.

Referring to FIG. 1 the apparatus comprises a container 10 having an exhaust port 11 passing through the cover or closure thereof. A plate or baffle means 12, generally parallel to the cover and bottom walls of container 10, is affixed to the closure of the container by a plurality of support members 13 to provide a space between the closure and the top of the plate. In this embodiment, plate 12 has a dimension, in a direction generally parallel to the cover, slightly less than the interior dimension of the container 10 in the like direction. The plate 12 forms upper or first, and lower or second compartments 14 and 15 and defines a passageway 16 communicating between the two compartments around the edge of the plate 12. The upper compartment 14 is also referred to herein as the third zone. The second compartment 15 is divided into inner (first) and outer (second) contiguous chambers or zones 17 and 18 by a continuous perforated member 19 which extends generally vertically from the inside bottom of container 10 to the bottom of plate 12. Also forming a part of the apparatus is a frangible closure member 20 which, in conjunction with the cover of the container, closes the exhaust port 11 to confine within container 10 gases generated by reaction of the pyrochemical mixture 22 located in chamber 17 until a certain minimum pressure is reached whereupon frangible member 20 ruptures to allow the gases to exit through exhaust port 11. Also located in communication with inner chamber 17 is an ignition device 21 capable of initiating reaction of a pyrochemical mixture located therein upon receipt of a signal from a crash impact sensor.

Figure 9:
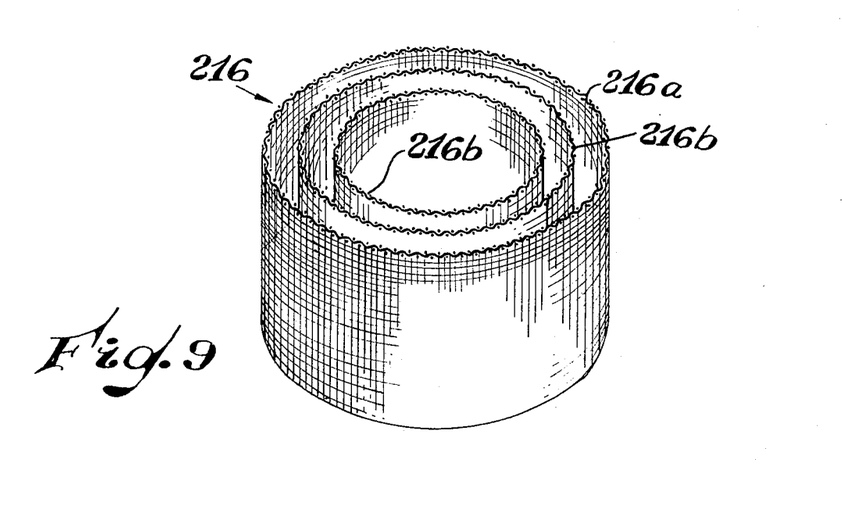
FIG. 9 illustrates one embodiment of a porous cooling means which may be employed in place of a particulate coolant with certain pyrochemical mixtures.

When assembled and ready for use, the apparatus of FIG. 1 contains a pyrochemical mixture 22 disposed within the inner chamber or zone 17. A cooling means is disposed within the outer chamber or zone 18. In this embodiment, a particulate coolant material 23 fills the entire chamber 18 and is retained in said position by abutting the baffle plate 12, container 10, and perforated member 19. A heat sink member, such as shown in FIG. 9, can be used in place of, or in combination with, the particulate coolant material when certain pyrochemical mixtures are employed. The apparatus 10 is attached to an inflatable bag or crash bag 26.

The plate 12 can also be a foraminous plate having the same horizontal dimension as the inside dimension of container 10. The openings in the foraminous plate provide a passageway between the first and second compartments 14 and 15. The plate may also be supported from the bottom or sides of container 10. Chambers 17 and 18 may be located as vertically or horizontally adjacent chambers with perforated member 19, or an equivalent, extending between the walls of container 10.

The gas generator apparatus may optionally include gas diffusing means designed to distribute gases exiting from the exhaust port into the inflatable bag 26. In FIG. 1 said gas diffusing means comprises a deflector plate 24 positioned over exhaust port 11 and a porous member 25 through which gases escaping from the exhaust port 11 pass into an inflatable bag 26.

The gas generator apparatus can be suitably attached to a properly designed inflatable bag and appropriately positioned, e.g., in a vehicle, as a safey device.

Inflatable bag designs are taught, for example, in U.S. Pat. Nos. 3,532,359; 3,324,816; 3,552,770; 3,514,725; 3,514,124; 2,834,606; 3,481,625; 3,481,626. A crash impact sensor is taught, for example, in U.S. Pat. No. 3,552,768. The teachings of these patents are incorporated herein by reference.

In operation, the ignition device 21, activated by a crash impact sensor, initiates the reaction of a pyrochemical mixture 22 in the first zone to produce hot gases rapidly. These gases pass from chamber 17 through perforated member 19 into contact with a particulate coolant 23, or a heat sink member in the second zone, and then through passageway 16 into upper compartment or third zone 14. The velocity and direction of flow of the gases may result in entrainment of particulate material, e.g. coolant particles, in the gas stream. The frangible member 20 will rupture when the pressure of the gases generated reach a certain minimum level. The gases are released through exhaust port 11 and into, for example, a suitable inflatable bag 26. This entire procedure takes place rapidly, e.g., within about 15 to about 200 milliseconds depending upon the vehicle requirements. Generally, the upper compartment 14 (third zone) is smaller than the lower compartment 15. The velocity of the gas stream exiting from the apparatus can be adjusted by changing the sizes of the exhaust port 11.

Any suitable pyrochemical mixture or composition can be employed. Examples of suitable pyrochemicals include black powder, gun powder, various other gun and rocket propellants and known gas producing pyrochemical mixtures. Certain potassium chlorate or sodium azide based pyrochemicals are particularly adaptable in the apparatus of the present invention. When the apparatus is employed to inflate crash bags for protection of humans, the pyrochemical mixture must be selected to avoid production of gases which would produce injurious effects. The gases must also be cooled sufficiently to prevent thermal burns to persons contacting the crash bag.

It is usually desired to employ a pyrochemical mixture which will produce relatively cool gases. With certain pyrochemical mixtures, the cooling means may comprise a porous heat sink member such as shown in FIG. 9. It is desirable to employ a heat sink member when possible because powdered coolants tend to produce solids which are carried in the gas stream. Further, heat sink members generally do not require as much space as powdered coolants and thus smaller generators can be built which still, however, produce the same quantity of gas as a larger apparatus containing a powdered coolant.

The cooling means 23 can comprise any material which, through reaction, decomposition or through sublimation, vaporization, or other phase change, or through absorption of heat (i.e., functions as a heat sink) will cool the gases generated by reaction of the pyrochemical mixture. Particulate materials generally considered useful for this purpose include, for example, powdered carbonates, bicarbonates, carbamates, azides, nitrides, and the like. Exemplary of specific materials are ammonium carbonate, ammonium bicarbonate, ammonium carbamate, magnesium carbonate, sodium bicarbonate and sodium azide. Preferably the particulate coolant should have the following characteristics: a temperature of decomposition or transition below about 800° C, good thermal conductivity, high endothermic heat of reaction or phase change, high surface to volume ratio, good storage stability, resistance to caking, low hygroscopicity, a rapid decomposition or transition rate and should not produce products which have injurious effects on humans.

Figure 7:
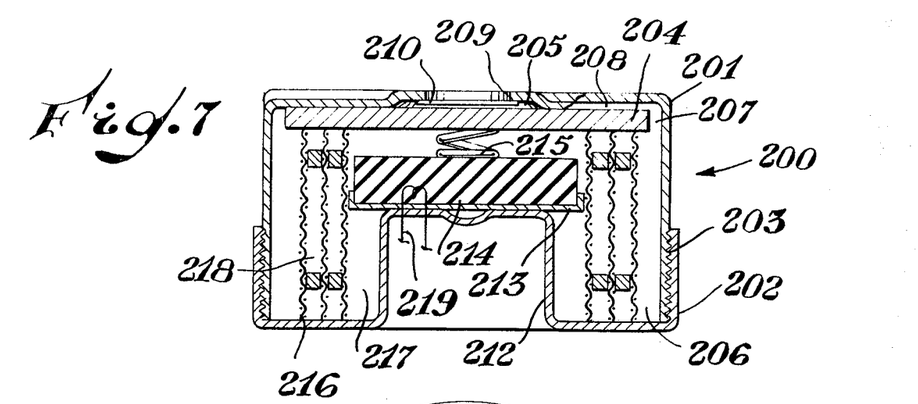
FIG. 7 shows a schematic side elevation of another embodiment of the invention provided with a removable bottom member having a cap which holds a pyrochemical charge spring biased inside the apparatus.

Cooling means which function as a heat sink include, for example, various porous structures having a large surface area such as, for example, glass wool, metal meshes or screens, metal foams, sintered powders, metal chips, steel wool, sinter-bonded wire, ceramic packing, and the like. Depending on the nature of the physical form of the heat sink material, a perforated member 19 may be or may not be required. If a series of metal screens are employed as the heat sink, for example, as shown in FIGS. 7 and 9, then a separate perforated member 19 is not necessary. If particulate materials such as metal chips are employed, it may be necessary to employ a perforated member 19 to separate the chips from the pyrochemical mixture.

The frangible member 20 may be constructed from plastics, metals, ceramics or other materials well-known in the art.

Figure 2:
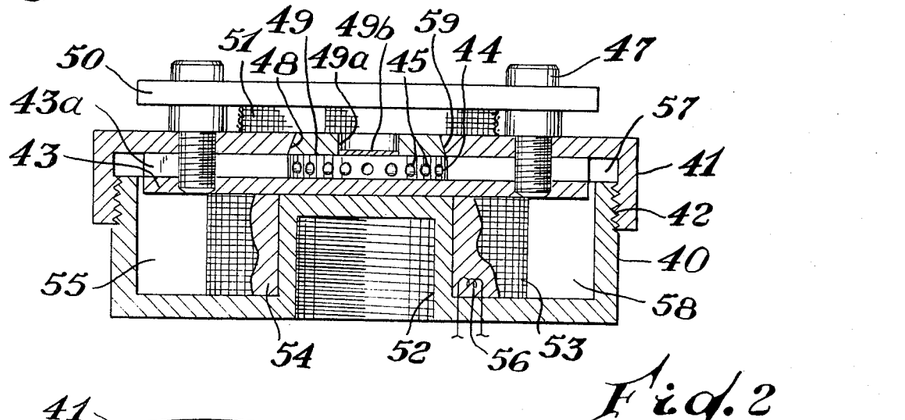
FIG. 2 shows a schematic side elevation of another embodiment of the invention.
Figure 3:
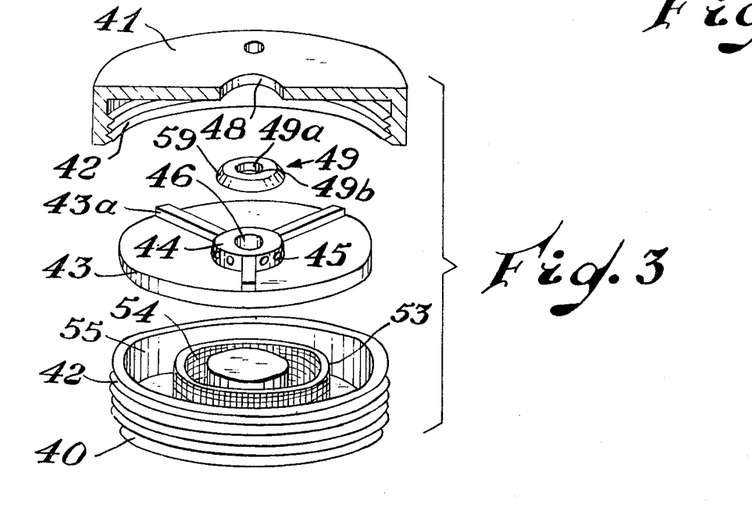
FIG. 3 shows an exploded view of a portion of the apparatus shown in section in FIG. 2.

Another embodiment of the invention is schematically shown in FIGS. 2 and 3. In this embodiment, which may be conveniently reused by insertion of fresh pyrochemical mixtures, cooling means and new frangible discs, a container 10 is assembled from a bottom member (container) 40 and top member (cap) 41 by employing a joining means such as a thread arrangement 42. Plate 43 having support members 43A, contains a centrally located raised member 44 having a plurality of apertures 45 extending through said raised member and communicating with a cavity 46. The apertures are generally disposed in a plane substantially parallel to the plane of plate 43. In this embodiment, the plate 43 is securely affixed in spaced relationship to the top member 41 by bolts or other fastening means 47. Affixed to cap 41 and covering exhaust port 48 is a removable frangible disc 49 which fits securely over the cavity 46 and has an opening 49A closed by a rupturable member 49B which covers the cavity 46 when the bolts 47 are drawn up tight. In this embodiment, the frangible disc 49 is securely held in place by a beveled outside wall 59 which mates with the beveled inside wall of exhaust port 48. Also secured to the top of cap 41 is a deflector 50 and foraminous member 51.

The bottom member 40 of the container 10 is provided with an inwardly extending portion 52 which is threaded on the inner side to enable the device to be securely positioned in, for example, a vehicle. Other means may be employed for fastening the device in a vehicle. For utilization as a driver safety device, the apparatus can be positioned by means of threaded portion 52 on a thread steering lug (not shown). A perforated member 53 extending generally vertically within bottom member 40, forms an inner chamber (first zone) 54 and outer chamber (second zone) 55. As taught herein before, the member 53 may not be necessary if a heat sink material such as a series of screens is employed as the cooling means. These chambers perform a function which is analagous to the function of chambers or zones 17 and 18 of the apparatus disclosed in FIG. 1. An ignition device 56 is also located in chamber 54. When the top member 41 is secured to the bottom member 40, the device is divided into an upper compartment or third zone 57 and a lower compartment 58. Upon ignition of the pyrochemical mixture contained in inner chamber 54, the device functions in a manner similar to that previously described for the embodiment shown in FIG. 1.

Figure 4:
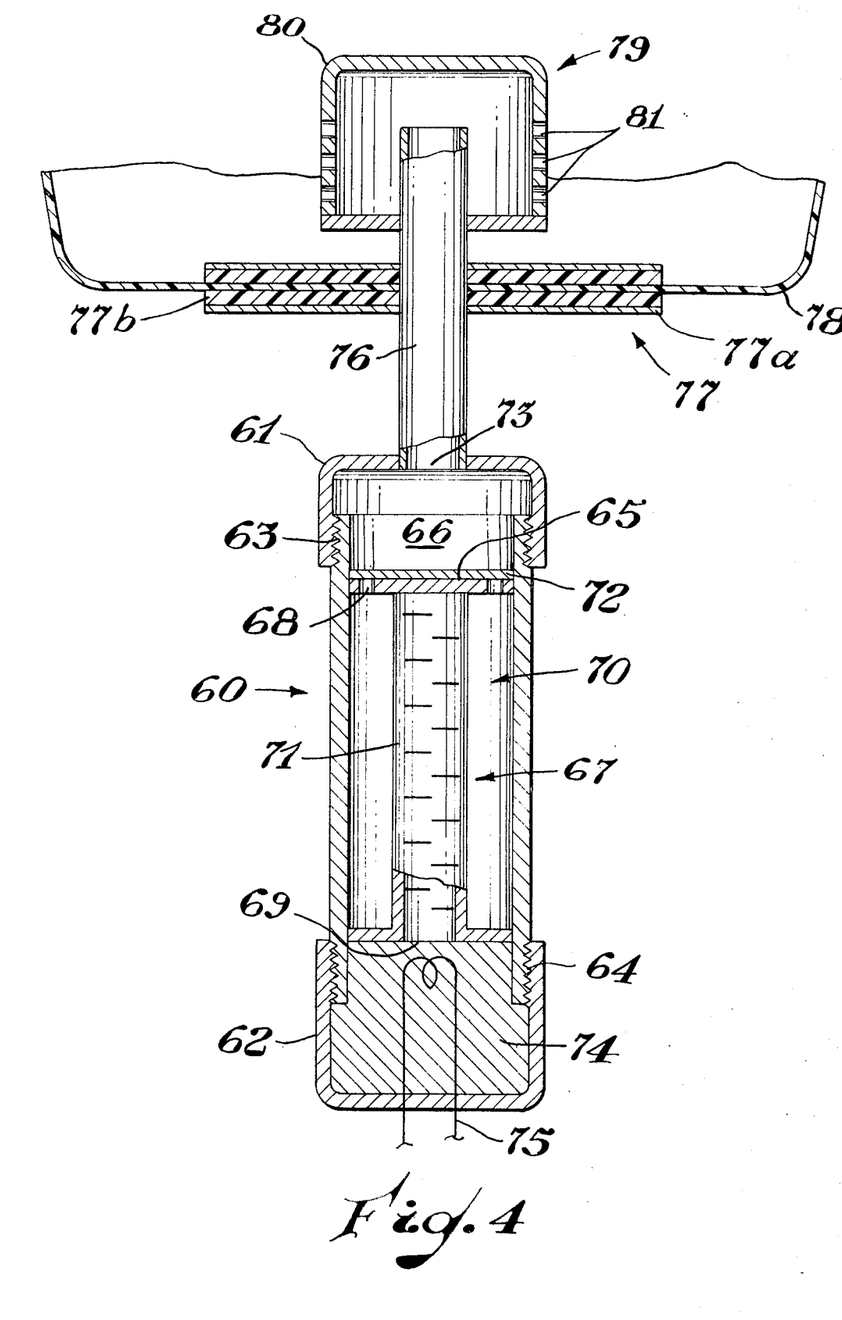
FIG. 4 shows a schematic side elevation of another embodiment of the invention.

In the embodiment shown in FIG. 4, the apparatus in constructed from a hollow cylindrical member 60 having removable top and bottom members 61 and 62 attached to the member 60 by employing joining means 63 and 64, e.g., threaded joints.

A baffle plate 65 divides the hollow interior of the assembled top and bottom members into a first compartment (third zone) 66 and a second compartment 67 with passageways 68 communicating between the two compartments. The second compartment 67 is divided into a first chamber (zone) 69 and a second chamber (zone) 70 by a continuous perforated hollow member 71. In this embodiment, the perforated hollow member 71 is spool shaped having a hollow interior which communicates with the lower portion of the first chamber 69 and is sealed at the top by the baffle plate 65.

A frangible member 72 confines, within the assembled apparatus, gas generated by reaction of a pyrochemical mixture 74 located in the lower portion of the first chamber (zone) 69 until a certain minimum pressure is reached whereupon the frangible member 72 ruptures to allow the gases to escape through exhaust port 73. Also located in communication with first chamber 69 and in contact with a pyrochemical mixture 73 is an ignition device 75 capable of initiating a pyrochemical mixture 74 upon receipt of a signal from a crash impact or other similar sensor.

Alternatively, the frangible member 72 can be located directly over exhaust port 73 by being attached to the upper portion of the top member 61.

In this embodiment the exhaust port 73 is extended a distance outside the apparatus by extension tube 76. Adapted to the top member 61 is a means 77 for securing an inflatable bag 78 to the extension tube 76.

The securing means 77 comprises two metal plates 77A and two resilient members 77B which hold the bag securely affixed over the tube 76.

Optionally, a gas diffuser means 79 designed to distribute the gases into the inflatable bag 78 is attached to the outlet portion of the tube 76. The diffuser means 79 comprises a cap 80 covering the external end of the extension tube 76 containing a plurality of apertures 81 for diffusing the gases into the bag 78.

This particular embodiment of the invention is useful in locations where a long relatively narrow apparatus can be positioned, such as, for example, in a dash board of a vehicle or the like.

Figure 5:
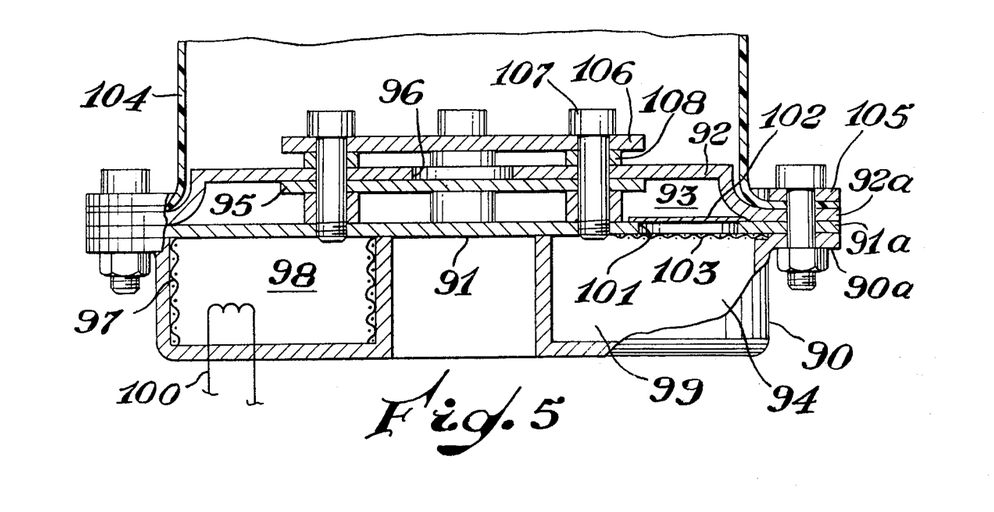
FIG. 5 shows a schematic side elevation of still another embodiment of the invention.
Figure 6:
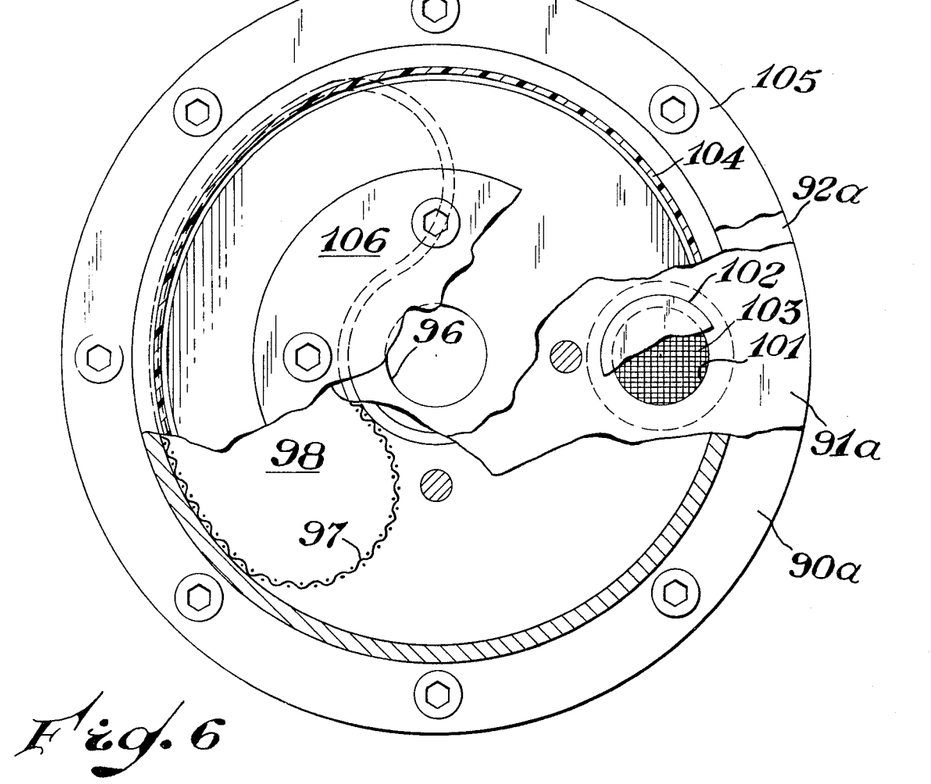
FIG. 6 shows a top schematic elevation of a portion of the embodiment of the embodiment shown in FIG. 5.

FIGS. 5 and 6 show another embodiment of the apparatus. It is similar in design to the embodiments shown in FIGS. 1–3, but the propellant chamber (first zone) is placed to one side and the coolant chamber (second zone) to the other side of the container.

The apparatus shown in FIGS. 5 and 6 comprises a lower member 90, a baffle plate 91, and top member 92 all of like peripheral dimension and having flange members 90A, 91A and 92A. The lower and top members 90 and 92, and plate 91 are securely fastened together to form upper (third zone) and lower compartments 93 and 94. Located in the upper compartment 93 is a frangible member 95 which, in cooperation with the top member 92, closes exhaust port 96. The frangible member 95 serves the same function as the frangible members 20, 49 and 72 described in the previous embodiments of the apparatus. Located in the lower compartment 94 is a porous member 97 which divides the lower compartment 94 into a first chamber (zone) 98 and a second chamber (zone) 99. There is also provided in communication with the first chamber 98 an ignition device 100 which serves the same function as the ignition devices described in the previous embodiments of the invention. The baffle plate 91 is provided with one or more apertures 101 to provide communication between upper compartment 93 and lower compartment 94. The aperture can be closed by a closure member 102 constructed of a very easily ruptured material, e.g., foil, to prevent moisture from coming into contact with material contained in the lower compartment 94 prior to ignition of a pyrochemical mixture contained in the first chamber 98. A cooling means may be contained in the second chamber 99. To aid in preventing the gases generated upon reaction of the pyrochemical mixture from blowing a particulate powdered coolant contained in the second chamber 99 into the upper compartment 93 and even out of exhaust port 96, the aperture 101 is covered by a second porous member 103.

An inflatable bag 104 is attached to the apparatus in communication with the exhaust port 96 by fastening means 105 located adjacent to the flange 92A of the top member 92.

Optionally, a gas diffuser means 106 is attached on the outside of the apparatus and directly in line with the exhaust port 96.

Various members of the apparatus are held together in spaced relation to each other by a plurality of fastening means 107 and spacers 108.

In operation of the embodiment of the invention depicted in FIGS. 5 and 6, the ignition device 100 ignites a pyrochemical mixture located in the first chamber (zone) 98 to rapidly produce gases. These gases pass through the porous member 97 and into contact with a cooling means, e.g. a powdered coolant, contained in the second chamber (zone) 99. The cooled gases then pass through aperture 101 into the upper compartment (third zone) 93. When a certain minimum pressure is generated inside the apparatus, the frangible member 95 ruptures and the gases exit through exhaust port 96 and inflate, for example, an inflatable bag 104.

Figure 8:
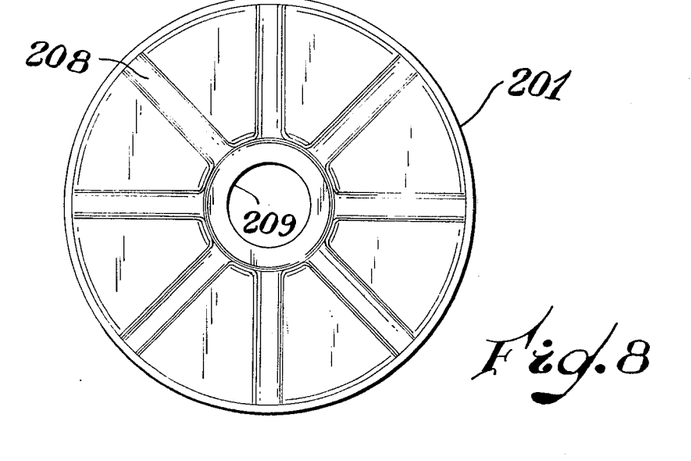
FIG. 8 shows an inside view in schematic elevation of the top member 201 of the embodiment shown in FIG. 7.

FIGS. 7, 8 and 9 depict another embodiment of the invention. The apparatus shown in these figures can be easily manufactured by stamping and welding techniques.

The apparatus comprises a container 200 formed of a top member 201 and a bottom member 202. The drawing illustrates the top and bottom members being assembled by a thread coupling 203. Other means of assembly can be employed, e.g., welding, and the like.

A plate 204 is positioned in the interior of the container 200 to form an upper compartment 205 and a lower compartment 206 which communicate with each other through a passageway 207 located around the periphery of the plate 204 which in turn communicates with a plurality of passageways 208 formed in the top portion of the top member 201. An exhaust port 209 is provided in the top member 201. The port is closed by a frangible member 210 which performs the same function as the frangible members shown in the other embodiments of the invention.

The bottom member 202 has an inwardly extending portion 212 at the top portion of which is affixed a cup shaped container member 213 for holding a pyrochemical charge 214 in the interior of the container. In this embodiment the pyrochemical charge is biased in position by a spring member 215. The means for cooling gases generated upon the ignition of the pyrochemical charge is a porous heat sink member 216 such as depicted in FIG. 9. The heat sink member 216 surrounds pyrochemical 214 and is placed so as to be between the pyrochemical and the passageway 207. There is formed within the container an inner chamber (zone) 217 containing the pyrochemical and an outer chamber (zone) 218 which may be completely occupied by the porous heat sink 216. If desired a particulate coolant may be employed in conjunction with the heat sink 216. An ignition device 219 is provided to ignite the pyrochemical 214.

The porous heat sink member 216 depicted in FIG. 9 is made up of a plurality of concentric arranged mesh screens 216a, 216b and 216c. As pointed out hereinbefore, the porous heat sink member can be employed in place of a particulate coolant when the pyrochemical produces gases which can be effectively cooled (i.e., the pyrochemical mixture burns cooler) in this manner.

What is claimed is:

1. A gas generator apparatus comprising:
   a. a hollow container having a cover member,
   b. a perforated screen, and
   c. a baffle plate,
   the perforated screen and baffle plate being disposed within the container, the baffle plate forming, with the container, first and second compartments, the first compartment being smaller than the second, the perforated screen being disposed within the second compartment to divide the same into
   a first chamber for receiving a solid pyrotechnic and
   a second chamber, in fluid communication with said first compartment via a restricted passageway, for receiving means for cooling, within said second chamber, a gaseous reaction product generated from said pyrotechnic,
   said cover member having means for securing said cover to said container and having an exhaust port located therein,
   d. a frangible closure member in sealed relationship with said exhaust port,
   e. a gas diffusing means exterior to said container and in communication with said exhaust port,
   f. an ignition means in communication with said first chamber, and
   g. an inflatable bag operatively surrounding said diffusing means in fluid communication with said exhaust port via said diffusing means, for receiving an effluent gas therefrom.

2. The gas generator apparatus of claim 1 wherein the container has a longitudinal axis and the baffle plate is substantially flat and disposed transversely to the longitudinal axis of the container.

3. A method of inflating an inflatable device which comprises:
   a. reacting in a first zone of a confined container, substantially all of a pyrotechnic charge, thereby generating under pressure, a charge of hot gaseous reaction product;
   b. cooling the charge of hot gases under pressure in a second zone of said container to a temperature suitable for introduction into the inflatable device;
   c. conducting the cooled gases from the second zone into a third zone of said container through a restricted passageway, said third zone being smaller in size than the sum of the first and second zones;
   d. releasing the cooled gases from the third zone when the pressure in the third zone reaches a predetermined minimum level; and
   e. introducing the released gases into the inflatable device.

4. The method of claim 3 including in addition, obstructing the flow of said gases released from said container to decrease the velocity and change the direction thereof to a velocity and direction suitable for introduction into said inflatable device.

5. The method of claim 3 wherein said cooling is accomplished by mixing said charge of hot gases under pressure with a particulate material which through a phase or chemical change cools the charge of hot gases, said quantitative relationship of said charge of hot gases and particulate cooling material being such as to cool the charge of hot gases released from said container to a temperature suitable for introduction into the inflatable device.

6. The method of claim 5 including in addition decreasing the velocity and changing the direction of the gases released from the container to a velocity and direction suitable for introduction into the inflatable device.

7. The method of claim 3 wherein said cooling is accomplished by mixing the hot gases with a porous material which through absorption of heat cools the charge of hot gases, said quantitative relationship of said hot gases and porous material being such as to cool the charge of hot gases released from said container to a temperature suitable for introduction into the inflatable device.

8. The method of claim 7 including in addition decreasing the velocity and changing direction of the flow of the gases from the container to a velocity and direction suitable for introduction into the inflatable device.

9. An inflatable device comprising:
 a. a container having an exhaust port;
 b. a gas generator means;
 c. a baffle means;
 d. an inflatable bag; and
 e. an ignition device for said gas generator said gas generator means comprising a pyrotechnic and a cooling means;
 said baffle means comprising a plate disposed within said container to form two compartments, the second compartment containing said gas generator means, the first compartment communicating with said exhaust port and having a smaller volume than said second compartment said plate further defining a restricted passageway between said first and second compartments;
 said cooling means being disposed between said pyrotechnic and said restricted passageway, adjacent to said restricted passageway, and abutting at least a portion of said baffle plate, wherein gases generated upon ignition of the pyrotechnic pass through the cooling means and immediately thereafter, through the restricted passageway; and
 said inflatable bag attached to said container in communication with said exhaust port.

10. The apparatus as defined in claim 9 including in addition a gas release means which, with said container and exhaust port, contains gases generated by said pyrotechnic in said container until a predetermined minimum pressure is generated within said container and thereupon releases said gases through said exhaust port.

11. The inflatable device of claim 9 wherein the container has a longitudinal axis, and the baffle means is a substantially flat plate disposed transversely to the longitudinal axis of the container.

12. A gas generator apparatus comprising:
 a. a hollow container,
 b. a perforated member,
 c. a baffle plate, the perforated member and baffle plate being disposed within the container, the baffle plate cooperating with the container to define a
 d. first compartment and
 e. second compartment
 in communication with each other via a restricted passageway, the container defining an exit port extending between the first compartment and an exterior surface of the container, the perforated member being disposed within the second compartment to form
 f. a first chamber for receiving a solid pyrotechnic charge for generating a gaseous reaction product and
 g. a second chamber in communication with said first compartment for receiving means for cooling, within said second chamber, the gaseous reaction product generated from said pyrotechnic, and
 h. an inflatable bag attached to said container and in communication with said exit port from said first compartment.

13. The gas generator apparatus of claim 12 wherein the container has a longitudinal axis and the baffle plate is substantially flat and disposed transversely to the longitudinal axis of the container.

* * * * *

UNITED STATES PATENT OFFICE
CERTIFICATE OF CORRECTION

PATENT NO. : 3,871,684
DATED : March 18, 1975
INVENTOR(S) : Gerald R. Staudacher, Thomas E. Dergazarian and George A. Lane It is certified that error appears in the above-identified patent and that said Letters Patent are hereby corrected as shown below:

In column 5, line 56, "apparatus in" should be

--apparatus is--.

In Fig. 9, the reference numeral for the screen of smallest diameter should be --216c-- instead of "216b".

Signed and Sealed this second Day of December 1975

[SEAL]

Attest:

RUTH C. MASON
Attesting Officer

C. MARSHALL DANN
Commissioner of Patents and Trademarks